United States Patent [19]

Silberschlag

[11] 4,117,918
[45] Oct. 3, 1978

[54] WEDGING CENTRIFUGAL CLUTCH WITH TORQUE LIMITER

[75] Inventor: Russell Earl Silberschlag, Glen Ellyn, Ill.

[73] Assignee: Borg-Warner Corporation, Chicago, Ill.

[21] Appl. No.: 754,935

[22] Filed: Dec. 28, 1976

[51] Int. Cl.² .............................................. F16D 43/14
[52] U.S. Cl. ................. 192/103 B; 192/3.31; 192/54; 192/45.1; 192/55
[58] Field of Search ........... 192/3.31, 105 BA, 103 B, 192/54, 45.1, 41 R, 38

[56] References Cited

U.S. PATENT DOCUMENTS

| | | | |
|---|---|---|---|
| 2,184,606 | 12/1939 | Lavaud | 192/3.31 X |
| 3,118,292 | 1/1964 | Schroter et al. | 192/54 X |
| 3,717,229 | 2/1973 | Perlick | 192/85 AA |

Primary Examiner—Benjamin W. Wyche
Attorney, Agent, or Firm—Robert L. Zieg

[57] ABSTRACT

A speed-responsive engaging mechanism adapted for use in a hydrodynamic device to couple turbine and impeller members including a disc secured to the turbine member having a series of cam surfaces thereon formed in apertures in the discs with a series of friction shoe assemblies mounted in the apertures in engagement with the cam surfaces. The friction shoe assemblies engage with the impeller at a predetermined speed of rotation of the turbine member, and the cam means induces a wedging engagement of the shoes with the impeller member. Spring means are provided to retain the shoe assemblies in the apertures, and a roller mechanism may be provided in each shoe assembly to provide relatively frictionless relative movement between the cam surfaces and the shoe assemblies. Means are provided between the roller and cam to limit the amount of torque which can be developed by the wedging action of the cam and roller mechanism.

5 Claims, 9 Drawing Figures

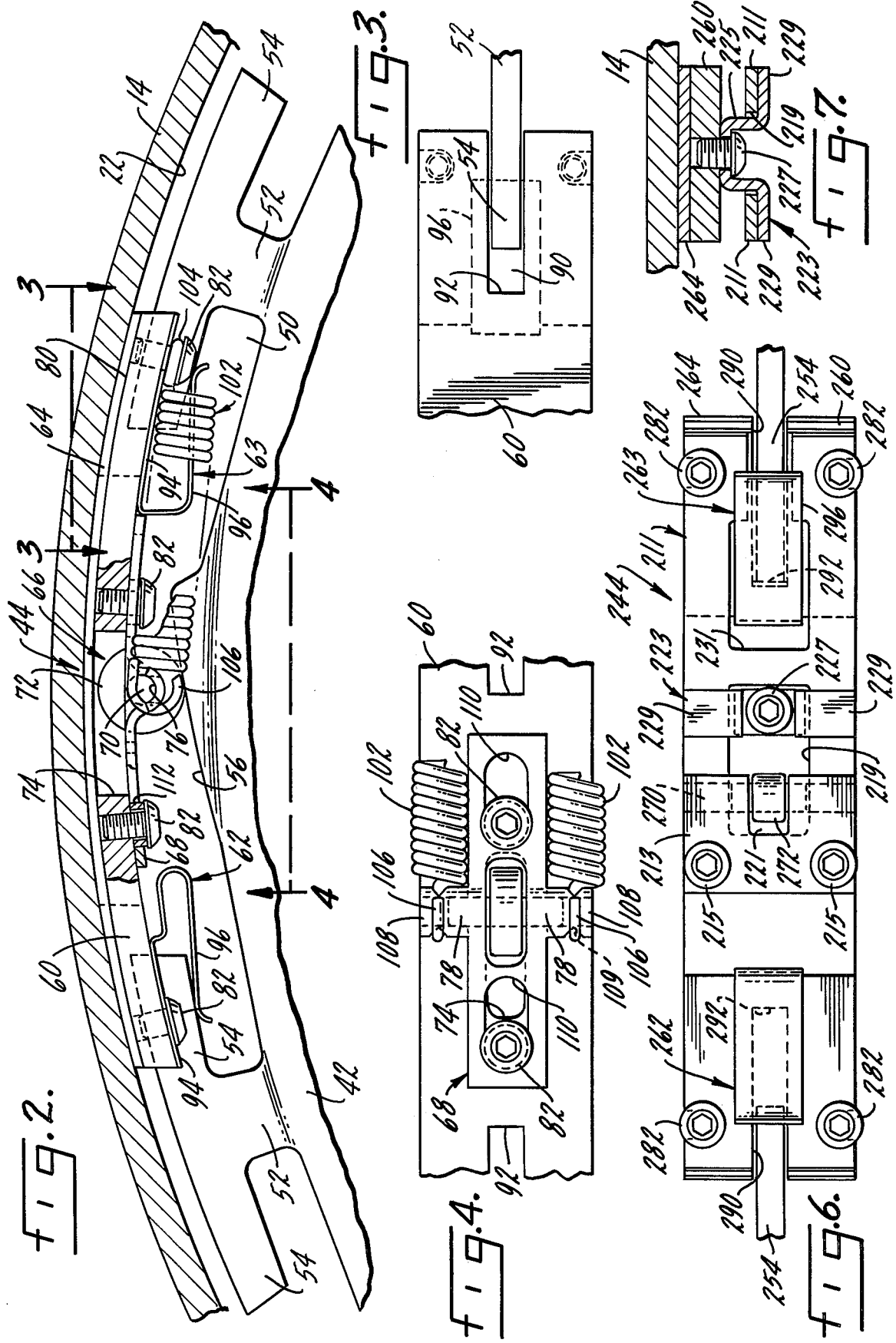

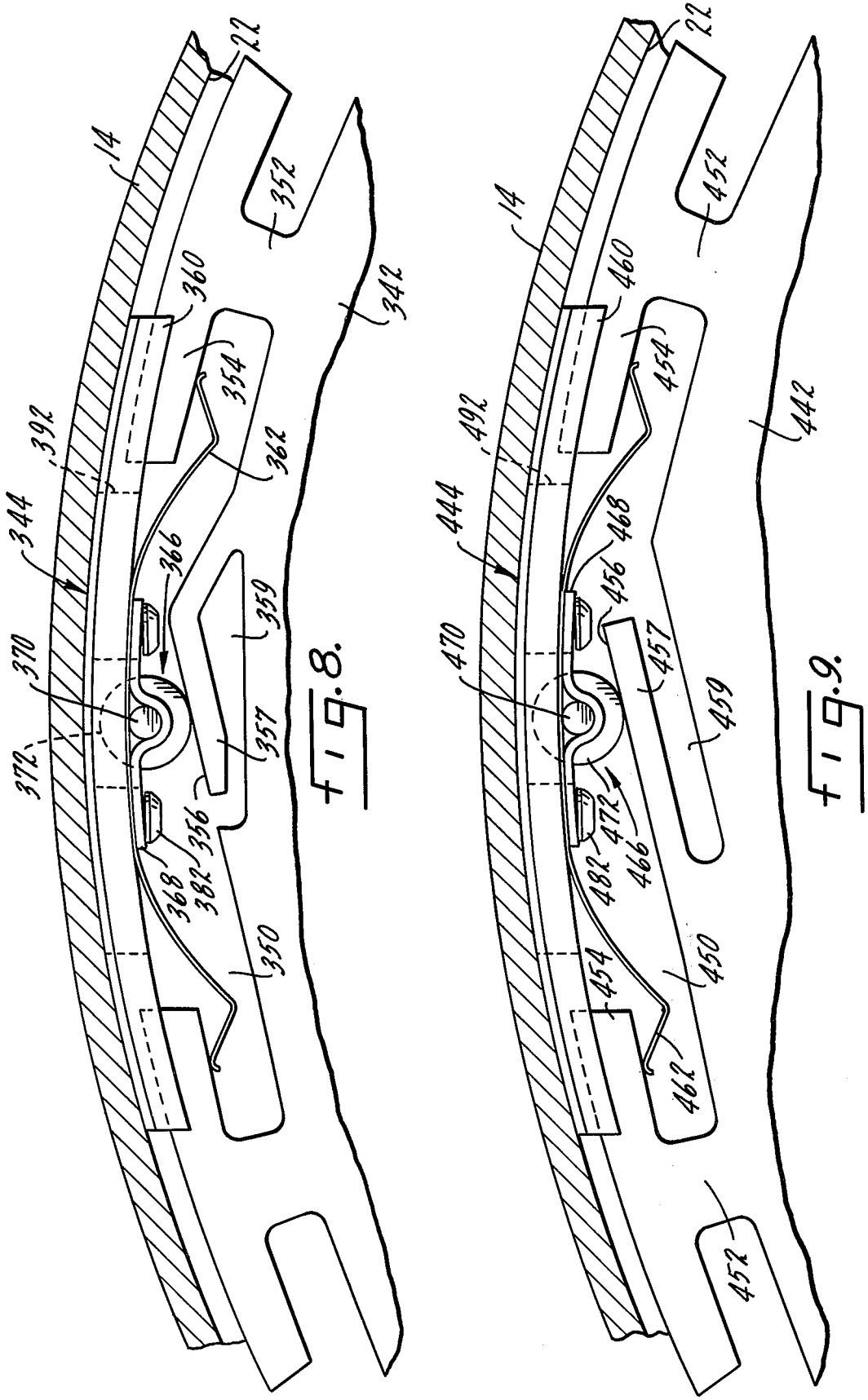

WEDGING CENTRIFUGAL CLUTCH WITH TORQUE LIMITER

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending application, Ser. No. 732,265, filed Oct. 14, 1976 now U.S. Pat. No. 4,083,440 of common assignee provides a clutch mechanism for hydrodynamic devices having a shoe assembly having a roller therein and engaged by centriugal force and, in addition, engaged by the wedging effect of a cam surface on the roller mechanism and such clutch devices lock together the impeller and turbine elements to improve efficiency by eliminating slippage. It has been recognized that the structures of the aforementioned applications as well as the device to be described herein provide a solution to the problem of lock-up clutches to provide a lock-up clutch which disengages during torque impulses or torque reversals to provide smooth, shockless operation and eliminate torsional vibrations.

These previous solutions to the torque converter clutch problem, although workable and dramatic improvements over those known prior, can operate in certain environments wherein the self-energizing effect of the cam and roller is so great that the shoes can be resistant to coming out of engagement at the proper time. Typically, self-energizing clutches need a simple and economical way of control so that they will engage and disengage at the proper time.

SUMMARY OF THE INVENTION

The present invention achieves all of the desirable objects listed above and provides an improved clutch mechanism for a hydrodynamic device in which there is a means to limit the torque which can be developed by the self-energizing feature of the assembly. The torque limiting structure is comprised of a spring mounting between the roller and the shoe assembly or in one embodiment of spring mounting of the cam surface itself.

BRIEF DESCRIPTION OF THE DRAWINGS

FIG. 2 is a sectional view taken along the lines 2—2 of FIG. 1;

FIG. 3 is a fragmented view along the lines 3—3;

FIG. 4 is a fragmented bottom view of the shoe assembly of FIG. 2;

FIG. 6 is a bottom view of the shoe assembly of FIG. 5;

FIG. 7 is a view taken along the lines 7—7 of FIG. 5;

FIG. 8 is a sectional view of another form of the invention; and

FIG. 9 is a sectional view of a further modified form of the invention.

BRIEF DESCRIPTION OF THE PREFERRED EMBODIMENT

Figure 1:
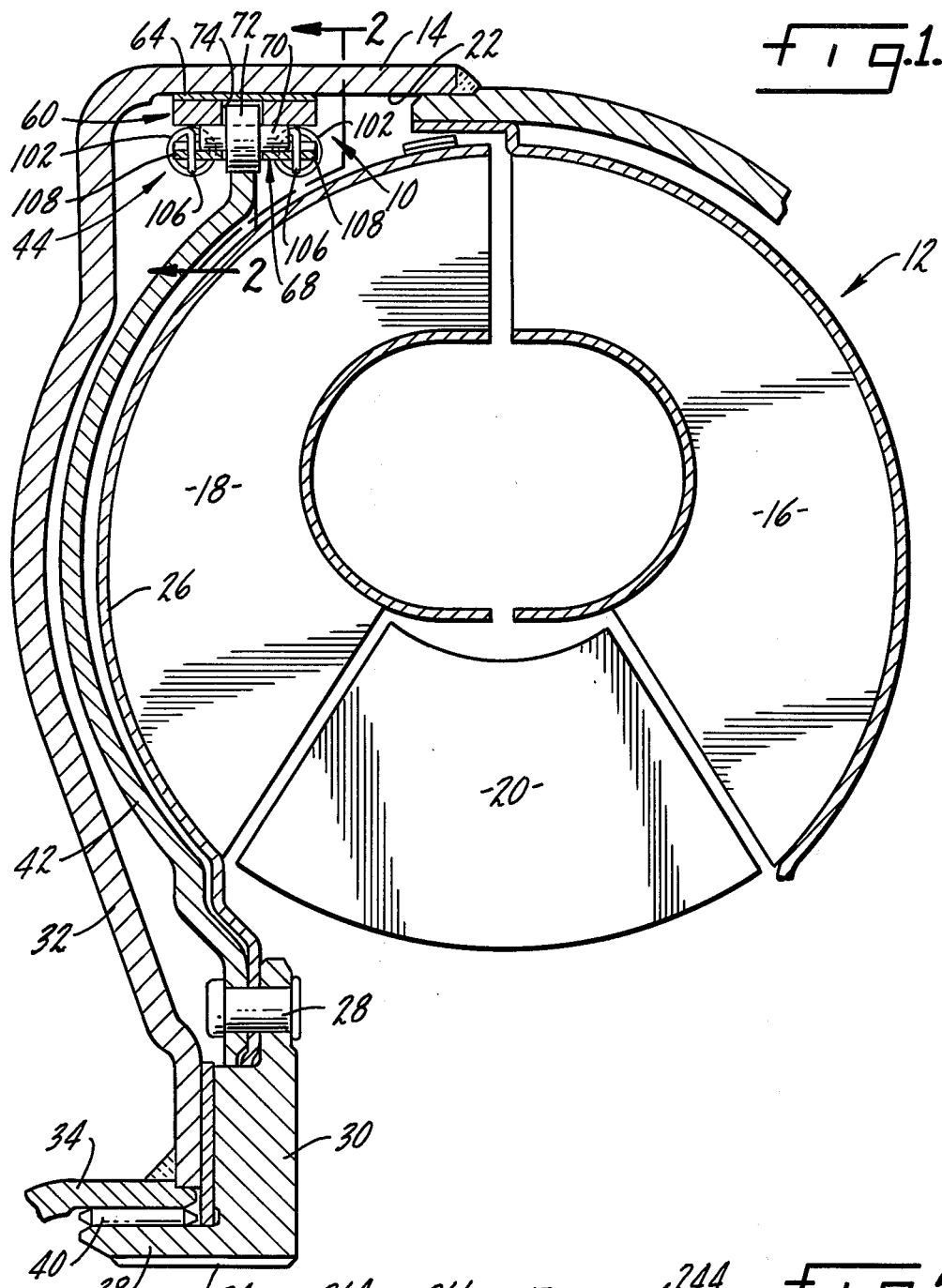
FIG. 1 is a cross-sectional view through a clutch mechanism for a hydraulic torque converter.

Referring to FIG. 1, an improved lock-up clutch or engaging mechanism 10 is disclosed. Clutch 10 is shown in a hydrodynamic device 12 which may be hydraulic torque converter having a drive shell 14 connected to drive a vaned impeller member 16. Torque converter 12 includes a vaned turbine member 18 driven hydrodynamically by impeller 16 and includes a stator member 20. The improved lock-up clutch 10 is operative to lock the turbine to the impeller by means of frictional engagement between clutch 10 and an inner annular surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which may be driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16 and drive shell 14.

The unique clutch 10 of the present invention is comprised of an annular curved disc 42 and friction devices or shoe assemblies 44. Disc 42 is concentrically mounted upon turbine hub 30 and is secured thereto by rivets 28. Annular discs 42 is curved to conform with the shape and curvature of turbine 18 and radial portion 32 to provide minimum space requirements for clutch mechanism 10 within torque converter 12. As illustrated in FIG. 2, disc 42 has a series of apertures 50 in which shoe assemblies 44 are mounted. Apertures 50 includes a series of T-shaped projections 52 which define tabs 54 extending radially toward the center fo apertures 50. Tabs 54 have cooperative engagement with shoe assemblies 44 to retain same on discs 42. Also provided centrally of apertures 50 is a cam surface 56, also referred to as a wedge or ramp surface. The cam surfaces 56 have a relatively slight curvature to maintain a relatively uniform wedge angle as is more particularly described in copending application Ser. No. 700,998; filed June 29, 1976; of common assignee.

Shoe assemblies 44 are comprised of a rectangular friction shoe 60 being generally arcuate in cross-section to conform with the arcuate shape of surface 22. Assembled to shoe 60 are springs 62 and 63, and a friction lining 64. Also assembled to the shoe is a roller mechanism 66 and a roller retainer 68. Roller mechanism 66 is comprised of a roller pin or axle 70 upon which a roller 72 is mounted. Roller 72 is centrally mounted in shoe 60 in a rectangular slot 74 upon axle 70. Axle 70 is received in partly cylindrical bearing supports or journals 76 defined within a raised portion 78 on retainers 68 on either side of slot 74.

Roller assembly 66 is mounted securely within retainer 68 such that the roller will roll on pin 70, pin 70 serving as a non-rotatable axle. Optionally, the pin 70 may be rotatable in journals 76 and be press-fitted in roller 72 whereby the roller and axle turn as a unit.

Friction lining 64 is bonded to the external arcuate surface 80 on shoe 60. Friction lining 64 may be of a paper of other known type.

Springs 62 and 63, and retainer 68 may be secured to shoe 60 by screws 82 as shown or may be secured by a process shown and described in copending application, Ser. No. 732,265. Assembly 44 is secured together by locating the retainer 68 on shoe 60 with the roller assembly and its axles 70 mounted in journals 76, and two shouldered screws 82 are to hold retainer 68 to shoe 60.

As shown in FIG. 3 the shoes 60 have slots 90 therein receiving disc 42 tabs 54 to locate the shoes on the disc. The slots 90 have stop surface 92 which will limit the arcuate travel of shoes 60 with respect to discs 42. The springs 62 and 63 each have a mounting leg 94 secured to shoe 60 by screws 82 and have a spring retaining arm 96 which engages under tabs 54 to secure the shoe assemblies in the disc 42.

As discussed above, the present invention provides a unique torque limiting feature in the self-energizing and centrifugal clutch 10 described herein. The torque limiting feature is provided by utilizing a pair of coil springs 102. The coil springs are secured to one end of shoe 60 by screws 82 extending through a loop 104 in the end of spring 102. The other end of the spring has a loop 106 which partly encircles on the ears 108 provided on retainer 68. The ears 108 have a groove 109 therein to receive the loop 106. The ears 108 extend from either side of the retainer 68 at 90 degrees thereto approximately the width of the friction shoe 60. The retainer 68 has slots 110 at either end thereof, which receive a pair of screws 82, and screws 82, have thereunder guides 112 received within the slots 110. The heads of the shoulder screws 82 are large enough so that they will not pass through the slots 110, thereby the retainer 68 is secured to shoe 60, but retainer 68 can move with respect to shoe 60 in an arcuate direction, as viewed in FIG. 2, for the extent of the length of slots 110, as will be later explained.

The coil springs 102 as viewed in FIG. 4, lay along either side of the retainer 68 and generally up against the shoe 60, thus providing a compact assembly. As can be seen in FIG. 1 and FIG. 2, a portion of the hook 106 passes across the end of the pin or axles 70, thus the axles 70 can be loosely secured within the retainer 68 and cannot come out of the assembly because of the loop 106 of the coil springs 102.

The operation of the device of the present invention is generally similar to that described with respect to the aforementioned copending application, Ser. No. 732,265, filed Oct. 14, 1976, and reference may be had to that application for a detailed description of the operation. In general the operation is that when the parts are at rest, or under idle conditions, the coil springs 102 will pull on retainer 68 to move it to its position illustrated in FIG. 2, with the lower end of the slots 110 engaging the guides 112 under screws 82, thus the retainer being in its maximum clockwise direction as viewed in FIG. 2. As in the former mentioned application, springs 63 and 62 tend to retract shoes or shoe assemblies 44 inwardly and retain the shoe assemblies 44 within the discs 42. When a predetermined speed of rotation is reached, the shoe assembly 44 will move out to an extent to engage friction lining 64 with the surface 22 in shell 14. The shell 14 moving faster at this time than the disc 42 and turbine 18. The relative movement between the shell 14 and the disc 42 will move shoe assemblies 44 clockwise, as viewed in the drawings, the roller 72 moving along cam surface 56 and performing a wedging action as described in the aforementioned application which tends to produce a self-energizing feature increasing the torque capacity of the clutch by means of the cam-wedging action.

The roller is used to provide for minimum friction between the shoe assemblies and the cam surface 56 as has been found beneficial in torque converter clutches of this type. Normally the torque capacity of the unit can increase as the wedging between the roller and cam increases. However, in the present application the unique torque limiting feature is provided in that when sufficient torque capacity of a predetermined amount has been obtained, the resistance to further wedging action of the rollers 72 and cam 56 will be such to create a force which exceeds the force of the springs 102. When the force of the springs 102 is exceeded, the shoe 44 under increasing torque conditions can still move clockwise, with respect to the disc 42, however the roller 72 stays in its position on the cam 56 and moves relative to the shoe 60, the springs 102 stretching under this condition. Thus, when spring 102 begins to stretch, only a relatively slight increase in torque capacity between shoe assembly 44 and surface 22 can develop since additional force results in movement of roller 72 with respect to shoe 60 rather than significantly increasing the wedging effect. When additional torque tends to wedge the roller further, and spring 102 stretches, eventually a position of the shoe 60 is reached wherein stop surface 92 engages with the end of the tabs 54, thus allowing no further arcuate movement of shoe 60. The only increase in engaging force possible at this point, is an increase in centrifugal force resulting from increased RPM of disc 42, since arcuate movement of shoe 60 is terminated with respect to disc 42.

When stop surface 92 engages the end of tab 54, a split power path, is derived through the clutch 10 in that part of the torque may be carried by the connection between stop surface 92 and tabs 54 and part may be carried by the rollers 72 and their engagement with the cam surface 56. This should result in increased life of the friction surfaces and the roller and cam surfaces since the loading on the roller and cam surface is reduced and no further axial displacement between shoe 60 and surface 22 is possible.

Thus, by use of a sliding retainer 68 as described above, and stretchable coil springs 102 mounting the roller assembly 66 and retainer 68, the maximum available torque which can be developed by the frictional engagement of surface 22 and shoe assembly 44 is limited depending upon the size of the springs 102 utilized. In a very convenient manner, by easily varying the torque capacity of the clutch, each clutch can be individually tailored to a particular engine and automatic transmission combination to provide proper upshifts and downshifts in the automatic transmission as described in copending application Ser. No. 732,265 filed Oct. 14, 1976. The clutch will come out of the engagement when desired since the wedging effect is limited.

Figure 5:
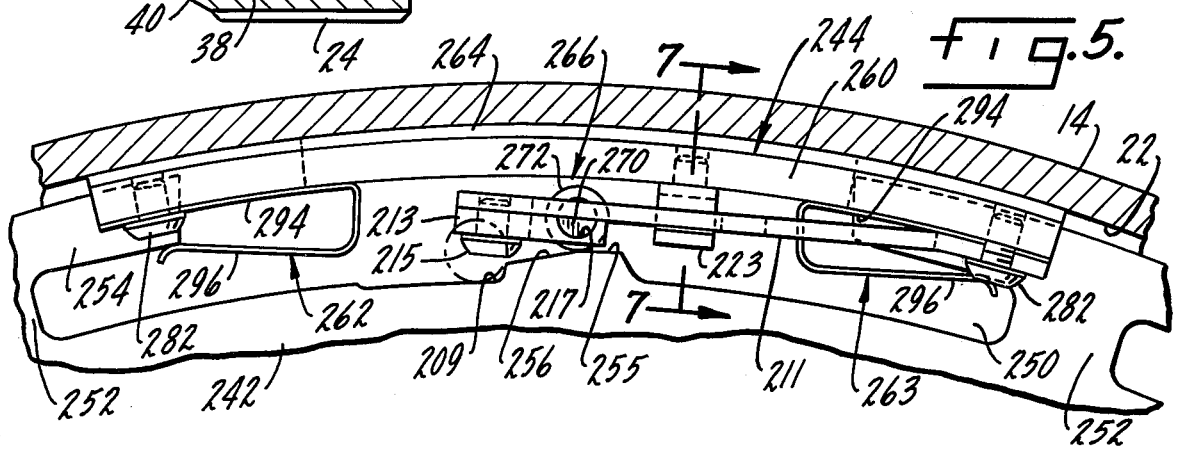
FIG. 5 is a sectional view of a modified form of the invention.

Referring to FIGS. 5, 6 and 7 a modified form of clutch mechanism with torque limiting is disclosed. In the embodiment of FIG. 5, like elements to the construction of those shown in FIGS. 1 through 4 carry like numerals with the exception of the use of the prefix 2. Thus corresponding numbers are in the "200" series in FIG. 5, unless they are specifically discussed and are odd numbers which indicates they are a different structural element.

In the embodiment of FIG. 5, apertures 250 in the disc 242, include cams 256. Cam 256 has a step down portion 209 which is provided in which the roller 272 can be engaged when the shoe is in its disengaged position as shown in phantom lines in FIG. 5. By having stepped down part 209 on cam 256, it is insured that shoe assembly 244 can completely release from surface 22 in the torque converter which would not otherwise result, as will be explained. The torque limiting feature in the construction of FIG. 5 is provided by having a flexible arm 211 secured to the shoe 260 by screws 282. Flexible arm 211 has a roller retainer 213 mounted thereon and secured thereto by screws 215. Retainer 213 has a grooved portion 217 which partly surrounds the pin or axle 270 for roller 272, thus securing the roller and axle within arm 211. Arm 211 has a slot 219 to accomodate roller 272. The retainer 213 has a slot 221 to accomodate roller 272. A retainer 223 is provided having a securing portion 225 extending through slot 219 and secured to the shoe 260 by screw 227. Securing portion 225 has retaining arms 229 on either side thereof which engage with arm 211 and limit the amount of travel of arm 211 away from shoe 260 to the extent indicated in FIG. 7. The limiting retainer 223 is necessary so that the shoe assemblies 244 can be assembled to the disk 242 since a spring load must be provided on arms 211, the arms 211 would otherwise be in a position further away from shoes 260 making the assembly operation more difficult.

As mentioned above the spring 262 is similar to that described for the structure of FIGS. 1 through 4 engaging under one of the tabs 254 on disk 242 and secured to shoe 260 by screws 282. However, to accomodate spring arm 211, spring 263 has a different construction in that it has a wide arm 294 mounted between arm 211 and shoe 260 and the upper arm portion 196 extends through an accomodating slot 231 in the arm 211 to thus engage under one of the tabs 254 and secure the shoe assembly 244 within the grooves 250 on disc 242. Again, shoe 260 has slots 290 therein to receive disc 242 and guide shoes 260 on the discs. The slots 290 have a stop surface 292 thereon which acts to limit the arcuate movement of the shoe assembly 244 with respect to disc 242.

The operation of the modified form of the invention as illustrated in FIGS. 5 through 7 is very similar to that described above for the embodiment of FIGS. 1 through 4. In the FIG. 5 embodiment as shoe assemblies 244 engage with surface 222 and move arcuately with respect to the disc 242, rollers 272 will move along cam 256 and tend to wedge the shoe assemblies in engagement with surface 22, providing the self-energizing feature and increasing the torque capacity of the clutch. At some point, the amount of wedging force developed by the cam 256 and roller 272 will exceed the spring load of the arm 211, at which time arm 211 will begin to flex toward shoe 260 and at this point only slight increases of torque capacity of the clutch will be developed. As the shoes 260 move arcuately, when stop 292 engages with tabs 254 on disc 242, no further arcuate movement of the shoe assemblies 244 with respect to disc 242 is possible. At this point the drive may take place in a split manner through the clutch, both through the driving connection between stop surface 292 and tabs 254 and through the engagement of roller 272 with cam surface 256.

As reviewed in FIG. 5 it can be seen that the retainer 213 has a significant mass such that at higher RPM's the centrifugal force will begin to move arm 211 outwardly, reducing the spring load on the roller at its engaging point with cam 256. Optionally, the clutch 10 can be designed with a weight of retainer 213 so that at higher RPM's as for example, above 2600 RPM, the arm may lift to such an extent to raise the roller completely off surface 256 and have all the drive through tabs 254. By using the centrifugal effect of the arm and retainer the load which must be transmitted by roller 272 through surface 256 can be significantly reduced to reduce wear on surface 256 and roller 272.

Optionally as illustrated in FIG. 5, cam 256 can have a two-slope profile, having a second surface portion 257 in which there is no further cam rise. At the point roller 272 enters the area of slope 255, the torque limit of clutch will already be exceeded and the roller at this point moves rapidly along cam 255 without any increase in torque capacity or further deflecting arm 211, thus shoes 244 quickly engage with tabs 254 through stop surface 292. At this time, all the drive is through tabs 254.

From the above it will be clear that the present invention provides a torque limiting feature by having a roller mechanism mounted on a spring arm 211 secured to shoe assemblies 244.

In FIG. 8 a further modified form of the present invention is illustrated. In this embodiment like elements of the FIG. to those of FIG. 1 through 4 carry the same numerals with the exception of the prefix 3, in other words the numbers are in the "300" series, where elements are common. Odd numbers are used for new type of structures shown in FIG. 8. The general arrangement of the mounting of the spring assemblies 344 in FIG. 8 and the use of the common one-piece spring 362 secured to the shoe assembly 344, by retainer 368 is very similar to that disclosed in copending application Ser. No. 732,256, filed Oct. 14, 1976 and reference may be had to that application for a more detailed description of the construction of the shoe assembly 344 and the disclosure of that copending application is hereby incorporated by reference.

In the embodiment of FIG. 8 cam surface 356 is provided on a flexible arm 357 which is formed by removing material from the disc 342 by punching therein, to form an additional aperture of slot 359. The operation of the construction of FIG. 8 is that the rollers 372 will move along cam surface 356 to develop a wedging and self-energizing action, to increase the torque capacity provided by the frictional connection between the shoe assembly 344 and surface 22. As torque capacity of the unit is increased, arcuate movement of the roller 372 and shoe 344 will increase wedging action to develop greater torque capacity, and will cause arm 357 to flex inwardly in a spring like manner, thereby producing a decreasing amount of self energizing. Eventually, as described above with respect to other FIGS., the stop surface 392 engages with tabs 354 to provide an additional torque transmitting connection between the clutch surface 22 and the disc 342 as well as driving through engagement of the rollers with cam surface 356.

A further modified form of the invention, is shown in FIG. 9, which is similar to that of FIG. 8, with the exception that the construction of the mounting of the cam surfaces 456 is slightly different. Again like elements carry like numerals as those in other FIGS., with the exception that the prefix 4 is used, in other words the numbers are in the "400" series. In the embodiment of FIG. 9 however, the cam surfaces 456 are mounted on a flexible arm 457, which is formed by punching or forming a relatively straight slot 459 in the disc 442 in the area of aperture 450.

The manufacture of the construction of FIG. 9 may be slightly more simple than that of FIG. 8 since the slot 459 is straight. Otherwise the operation of the unit shown in FIG. 9 is similar to that of FIG. 8 wherein the flexible arm 457 can flex inwardly when the predetermined torque capacity of the clutch is exceeded. However the capacity is limited by the flexing of the arm aided by an increasingly longer lever arm which allows the shoe to move against the stop.

With respect to the devices of FIGS. 8 and 9, it should be noted they have quite different operating characteristics which must be taken into account in designing a unit with a torque limiting design of this type. In FIG. 8, as roller 372 moves along arm 357, and arm 357 deflects, the effective lever arm or cantilever beam is shortened thus the effective spring rate and force required for each increment of deflection is increased. Also, as arm 357 deflects, the ramp angle increases increasing the tangential torque component at the point of engagement between the roller and the disc.

However in the FIG. 9 structure as the roller 472 moves along arm 457, the effective lever arm or cantilever beam increases in length so that the spring rate and force for each increment of deflection is reduced. Also the ramp angle decreases so that the tangential torque component at the point of engagement of roller and cam is reduced.

In addition, it should be noted that since discs 342 and 442 are rotating, centrifugal force will affect the arms 357 and 457. Taking into account the above characteristics it can be seen that either a device of the FIG. 8 or the FIG. 9 type can be selected depending on the characteristics desired in a particular environment.

The engaging mechanism 10 of the present invention, when installed in a hydraulic torque converter as used in an automotive automatic transmission, will release under several conditions which are desired in an environment of this type. The release and reengagment of the clutch 10 occurs due to the inherent structure of the device without the requirement of any outside controls.

Due to the design of clutch 10, when the clutch is locked up during operation of the vehicle and the throttle of the vehicle is suddenly depressed to demand higher torque, the drive-line torque will rise to a greater value than the torque capacity of clutch 10 causing clutch 10 to slip and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on downshifts, since a torque reversal may occur at such times. As known in the art, during shifting, release of clutch 10 is desired to allow the converter to return to its shock absorbing characteristics.

It has also been found during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable. It has been found that the present invention is improved by the torque limiting feature described herein which insures that the torque capacity will be such that the clutch will release as desired in even the most difficult environments.

Various of the features of the invention have been particularly shown and described, however, it should be obvious to one skilled in the art that modifications may be made therein without department from the scope of the invention.

What is claimed is:

1. An engaging mechanism comprising, first and second relatively rotatable members, an annular disc fixed to said first member, a plurality of shoe assemblies mounted in said disc, cam means on said disc, said assemblies including means in engagement with said cam means, said assemblies having a frictional surface thereon, centrifugal force acting to urge said assemblies into engagement with said second member at a given speed of rotation, said assemblies moving along said cam means after initial engagement whereby said devices are wedged between said disc and said second member to self-energize and increase the torque capacity of the clutch, torque limiting means associated with said cam and assemblies operating to limit the torque capacity of the clutch developed by said self-energizing feature, said assemblies include roller mechanisms engaging the cam and said torque limiting means includes spring means mounting said rollers wherein said torque limiting means comprises a flexible arm on said shoe assembly mounting said roller mechanism, said arm flexing when the predetermined torque capacity is exceeded.

2. An engaging mechanism comprising, first and second relatively rotatable members, an annular disc fixed to said first member, a plurality of shoe assemblies mounted in said disc, cam means on said disc, said assemblies including means in engagement with said cam means, said assemblies having frictional surface thereon, centrifugal force acting to urge said assemblies into engagement with said second member at a given speed of rotation, said assemblies moving along said cam means after initial engagement whereby said devices are wedged between said disc and said second member to self-energize and increase the torque capacity of the clutch, torque limiting means associated with said cam and assemblies operating to limit the torque capacity of the clutch developed by said self-energizing feature, said assemblies include roller mechanisms engaging the cam and said torque limiting means includes spring means mounted said rollers wherein said torque limiting means comprises at least one coil spring connected to said roller mechanism and the shoe assembly and said roller mechanism being slidably mounted on said shoe assembly whereby said roller mechanism can move with respect to said shoe assembly against the force of said spring.

3. A clutch mechanism comprising, first and second relatively rotatable members, an annular disc fixed to said first member, a plurality of shoe assemblies mounted in said discs, cam means on said disc, said assemblies including roller means in engagement with said cam means, said assemblies having a frictional surface thereon, centrifugal force acting to urge said assemblies into engagement with said second member at a given speed of rotation, said assemblies moving along said cam means after initial engagement whereby said devices are wedged between said disc and said second member to increase the torque capacity of the clutch in a self-energizing manner, torque limiting means to limit the torque capacity of the clutch, said torque limiting means including a roller mechanism in engagement with said cam means and said roller mechanism being mounted on a flexible arm secured to said shoe assembly, and said arm being deflected when said shoe assembly is mounted in said clutch to provide a spring load on said roller mechanism.

4. A mechanism as claimed in claim 3 including means limiting the movement of said arm with respect to said shoe assembly.

5. A mechanism as claimed im claim 4 wherein said shoe assemblies have stop means to limit arcuate travel of said shoes with respect to said discs.

* * * * *